United States Patent
Chieng et al.

(10) Patent No.: US 11,133,745 B2
(45) Date of Patent: Sep. 28, 2021

(54) AUTOMATIC POWER-ON-RESET DETECTION AND RECOVERY OF A MULTI-PHASE DIGITAL BUCK CONTROLLER

(71) Applicant: Renesas Electronics America Inc., Milpitas, CA (US)

(72) Inventors: Daniel Chieng, Austin, TX (US); Michael Payne, Austin, TX (US); David Beck, Austin, TX (US); Adam Vaughn, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 48 days.

(21) Appl. No.: 16/792,085

(22) Filed: Feb. 14, 2020

(65) Prior Publication Data
US 2020/0274449 A1 Aug. 27, 2020

Related U.S. Application Data (60) Provisional application No. 62/808,625, filed on Feb. 21, 2019.

(51) Int. Cl.
| | |
|---|---|
| *H02M 3/158* | (2006.01) |
| *H02M 3/157* | (2006.01) |
| *H02M 3/156* | (2006.01) |
| *H02M 1/084* | (2006.01) |
| *G05F 1/62* | (2006.01) |
| *G05F 1/56* | (2006.01) |

(52) U.S. Cl.
CPC ............ *H02M 3/1584* (2013.01); *G05F 1/56* (2013.01); *G05F 1/62* (2013.01); *H02M 1/084* (2013.01); *H02M 1/0845* (2013.01); *H02M 3/156* (2013.01); *H02M 3/157* (2013.01); *H02M 3/1586* (2021.05)

(58) Field of Classification Search
CPC .... H02M 1/084; H02M 1/0845; H02M 3/156; H02M 3/157; H02M 3/1584; H02M 3/1586
USPC ................................ 323/241, 269, 272, 283
See application file for complete search history.

(56) References Cited

U.S. PATENT DOCUMENTS

| | | | | |
|---|---|---|---|---|
| 6,801,028 B2* | 10/2004 | Kernahan | ........... | H02M 1/0845 323/283 |
| 7,446,430 B2* | 11/2008 | Leung | .............. | H03K 3/356121 307/38 |
| 7,793,005 B1* | 9/2010 | Fernald | ............... | H02M 3/1584 710/3 |
| 8,710,810 B1* | 4/2014 | McJimsey | ............... | G05F 1/462 323/272 |
| 2006/0125451 A1* | 6/2006 | Tabaian | ........... | H02M 3/33592 323/222 |

(Continued)

*Primary Examiner* — Gary A Nash
(74) *Attorney, Agent, or Firm* — Foley & Lardner LLP (57) ABSTRACT

The present embodiments allow multiphase buck controllers to be able to detect Power-on-Reset (POR) automatically and subsequently reboot the system and reconfigure the system as a single or multi-rail system. Some embodiments use an onboard bus that can communicate between controllers. In these and other embodiments, the system is able to recover automatically from a power failure afflicting any or all of the controllers. Embodiments are applicable to flexible plug-and-play modular digital buck regulation applications.

14 Claims, 8 Drawing Sheets

(56) References Cited

U.S. PATENT DOCUMENTS

| | | | |
|---|---|---|---|
| 2007/0040657 A1* | 2/2007 | Fosler | H02J 13/0062 340/333 |
| 2012/0086416 A1* | 4/2012 | Kudo | G06F 1/26 323/265 |
| 2013/0305065 A1* | 11/2013 | Tanaka | H02M 3/158 713/300 |

* cited by examiner

AUTOMATIC POWER-ON-RESET DETECTION AND RECOVERY OF A MULTI-PHASE DIGITAL BUCK CONTROLLER

CROSS-REFERENCE TO RELATED APPLICATIONS

The present application claims priority to U.S. Provisional Patent Application No. 62/808,625, filed Feb. 21, 2019, the contents of which are incorporated by reference herein in their entirety.

TECHNICAL FIELD

The present embodiments relate generally to power converters, and more particularly to automatic power-on-reset detection and recovery of a multi-phase digital buck controller.

BACKGROUND

The configuration of a multi-phase voltage regulator is needed to ensure that all phase components for any desired number of phases and master/slave designations operate together properly. This need becomes even more acute in the event of a power failure or power glitch, especially when a controller for one phase experiences such a failure or glitch, while others do not. It would be desirable to enable such systems to operate together properly in such situations, among other things.

SUMMARY

The present embodiments allow multiphase buck controllers to be able to detect Power-on-Reset (POR) automatically and subsequently reboot the system and reconfigure the system as a single or multi-rail system. Some embodiments use an onboard bus that can allow for communication between controllers. In these and other embodiments, the system is able to recover automatically from a power failure afflicting any or all of the controllers. Embodiments are applicable to flexible plug-and-play modular digital buck regulation applications.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

In general, the present embodiments allow a multiphase buck controller system, in the event of a power failure or power glitch, during which some controllers experience reset/POR while others may not, to automatically detect and recover from the event and preserve synchronization between the controllers.

By way of background, DC-to-DC voltage conversion is often performed by switching voltage regulators, or step-down regulators, also referred to as voltage converters, point-of-load regulators, or power converters, converting an input voltage to a regulated output voltage as required by one or more load devices. More generally, voltage regulators and current regulators are commonly referred to as power converters, and as used herein, the term power converter is meant to encompass all such devices. Switching voltage regulators often use two or more power transistors to convert energy at one voltage to another voltage. One common example of such a voltage regulator, commonly called a buck regulator or buck controller operates to convert an input voltage (e.g. from an adapter, a power line, battery, etc.) to a lower regulated voltage. It should be noted that although the present embodiments will be described in connection with an example application in a buck regulator, this is not limiting. Rather, one or more principles of the present embodiments can also be practiced in other types of regulators such as buck-boost and boost regulators.

Voltage regulators are sometimes implemented using a current share configuration in which power is distributed through shared voltage supplies. Distributed power through shared point of load supplies has a number of compelling advantages over a single point of load supply, or regulator. Distributed power or current sharing may be used to accommodate the ever increasing current demands associated with low voltage applications through better efficiency over a wide range of output currents, reliability through redundancy, and distributed heat dissipation.

Figure 1:
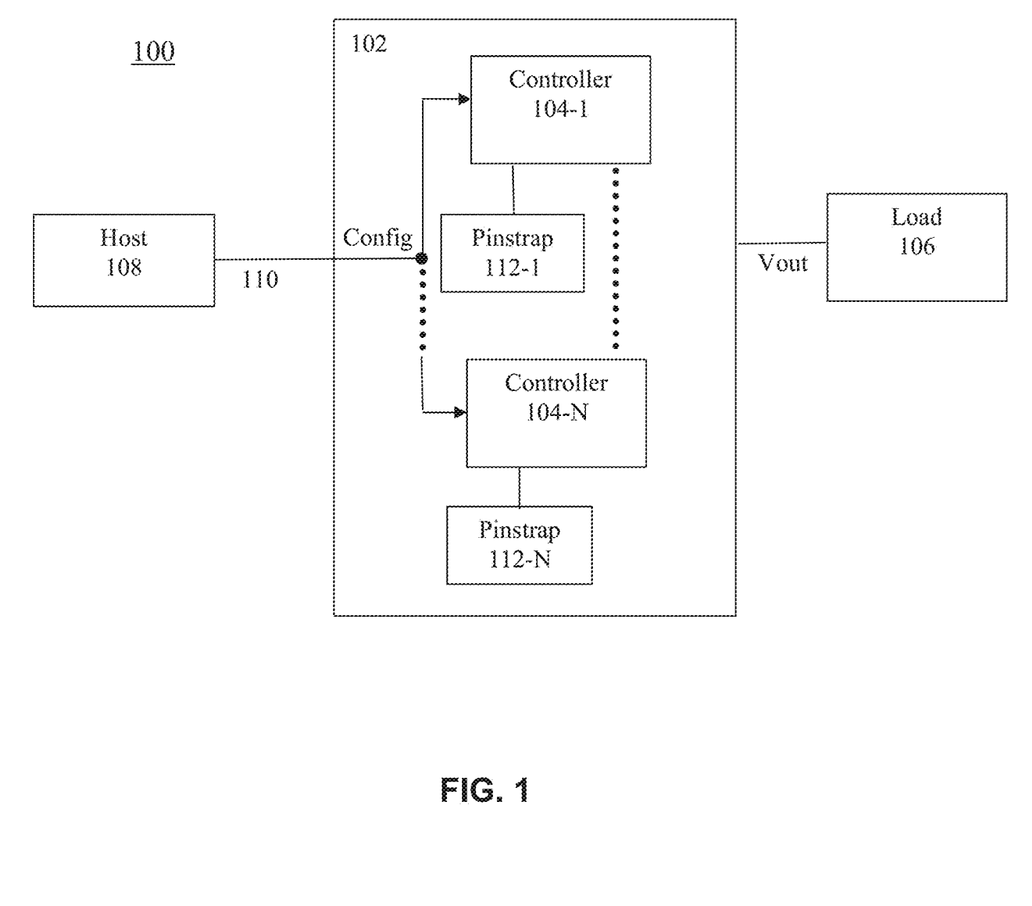
FIG. 1 is a block diagram illustrating an example multiphase regulator system communicating with an external host for performing configuration.

A block diagram illustrating aspects of an example system a buck regulator having a current share configuration is shown in FIG. 1.

As shown, system 100 includes a multiphase voltage regulator 102 including a "rail" of a plurality of controllers 104-1 to 104-N commonly coupled to provide power with a regulated voltage to a load 106 (e.g. a server, storage equipment, telecommunication and data communication equipment, one or more integrated circuits such as FPGA, ASIC, DSP, memory, etc.). Each of the controllers 104-1 to 104-N is thus associated with a respective phase of the multiphase voltage regulator 102. Each controller 104 can be implemented in various ways. In one common implementation, each controller 104 is implemented as a single digital integrated circuit (with an external pair of power FETs and inductor, not shown). As further shown in FIG. 1, system 100 includes a host 108. During operation of system 100, host 108 can receive operating, fault, and other information from controllers 104-1 to 104-N via a bus 110 (e.g. SMBus/PMBus), and can provide certain control or other commands to controllers 104-1 to 104-N via bus 110.

As set forth above, a multiphase buck regulator 102 having a current share configuration has many advantages such as efficient voltage conversion over a wide range of output currents, fast transient response, reliability through redundancy, and distributed heat dissipation. However, the present applicant recognizes several drawbacks and challenges of conventional approaches such as that shown in FIG. 1. For example, when each controller 104 is implemented as a separate integrated circuit, a substantial amount of configuration typically needs to be performed for the voltage regulator 102 to operate properly as a combined entity. For example, each controller 104 needs to be configured with information such as whether it is a master or slave phase, how many total phases are in the system, which phase number of the total number of phases it is (for phase interleaving, for example), etc. Moreover, depending on whether the controller 104 is a master or slave, still further configuration may need to be performed so that it properly operates in that role (e.g. enabling sharing of current information with other phases if it is the master).

These and other configurations can be performed in a variety of ways. In an example where each controller 104 is implemented by a separate integrated circuit, some configuration can be implemented using pinstraps 112 that are physically and/or electrically connected to one or more pins of the integrated circuit package. However, the number of pins on an integrated circuit is typically very limited and it is preferable to have as few pins as possible dedicated to implementing configuration, as opposed being available for dynamic use during operation of system 100. Some configurations can be performed by an external entity such as host 108 via bus 110, such as during a power up of system 100. However, this requires host 108 to know and store detailed information regarding the controllers 104, as well as to externally and independently store data and programs to perform the necessary configuration of voltage regulator 102 during every power up, which can be burdensome and difficult to manage. Still other configurations can be performed by storing information in each controller 104 (e.g. in a non-volatile memory (NVM) not shown), which information the controllers can access and use during power up to allow it to operate in the proper role. However, the amount of NVM that is available in each controller 104 may be very limited and it may not be sufficient to store all of the necessary information.

Relatedly and additionally, the number of phases (i.e. the number N) is typically fixed after the system 100 is configured and being used in operation. It may be subsequently determined from information gained during operation of system 100 that the number of phases (i.e. the number of controllers 104) is not appropriate for the demands of load 106. If that is the case, significant work and expense may be required to adjust the number of controllers 104, as well as to correspondingly change the configuration information needed (e.g. in controllers 104, as well as host 108) for the adjusted number of controllers 104 in system 100 to operate properly.

According to certain aspects, therefore, one or more of the present embodiments allows multiple controllers to be automatically configured as a single or multi-rail system using an onboard bus that can communicate between controllers with a minimal set of pinstraps. This allows the system to be configured with a reduced set of configuration pins and without the need for stored configurations in the NVM or external host. This essentially allows flexible plug-and-play for modular digital voltage regulation applications.

Figure 2:
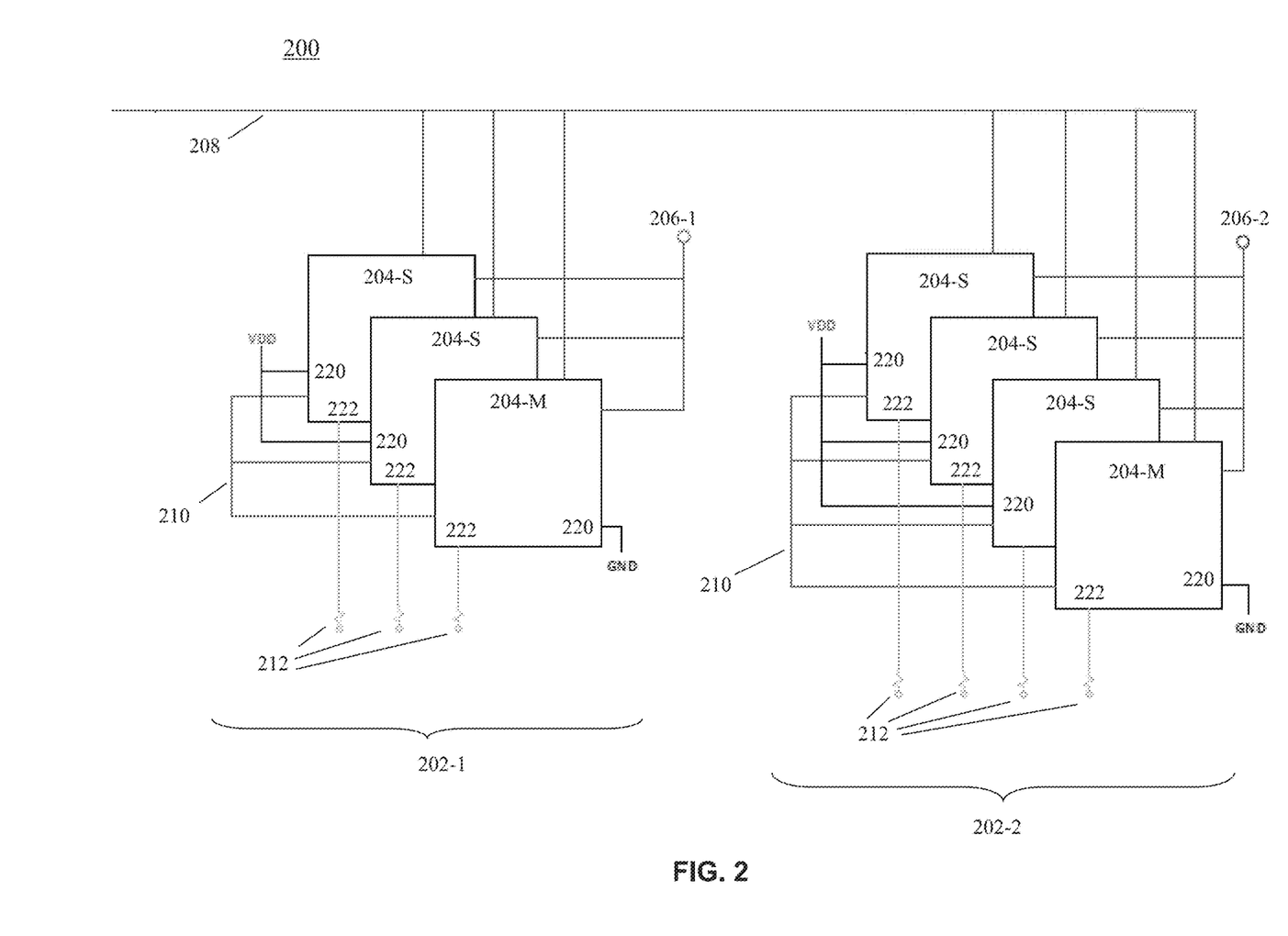
FIG. 2 is a block diagram of an example system having a plurality of rails including multiphase controllers according to the present embodiments.

FIG. 2 is a block diagram illustrating an example system according to embodiments.

In some embodiments such as the one illustrated in FIG. 2, the system 200 includes a plurality of rails (e.g. rail 202-1 and 202-2 as shown), with each rail 202 comprising an independent plurality of controllers 204 (i.e. phases), with the number of controllers 204 in each rail 202 possibly being different from each other. For example, as shown in FIG. 2, rail 202-1 includes three phases/controllers 204 and rail 202-2 includes four phases/controllers 204. The controllers 204 in each rail 202 are interconnected together to supply a respective regulated output voltage 206 to one or more loads (not shown), which may or may not have the same voltage value. Although only two rails are shown, it should be noted that the number of rails is not limited to this number and in some embodiments, the number of rails can be eight or higher. As further shown in FIG. 2, the controllers 204 of each rail 202 are all communicatively coupled to a bus 208 (e.g. SMBus/PMBus), which may be further communicatively coupled to a host (not shown) such as a host as described above in FIG. 1. Meanwhile, each controller 204 within a rail 202 is communicatively coupled to each other in the same rail via a local bus 210.

According to some aspects, the embodiment shown in FIG. 2 uses only two pins on each controller 204 for configuration, in particular master/slave pin 220 and voltage/address pin 222. The master/slave pin 220 contains information indicating whether the controller is the master or a slave (denoted as 204-M or 204-S, respectively in FIG. 2). In this example, a controller 204 is configured as a master by connecting the pin 220 to ground or other reference potential, whereas a controller 204 is configured as a slave by hard-wiring or connecting the pin 220 to Vdd or other voltage supply. As will be described in more detail below, this simple configuration of just two pins on controller 204, as well as firmware stored in each controller 204 and inter-controller communications via local bus 210, allows for each rail 202 to be automatically configured for correct operation, regardless of the number of phases/controllers that are coupled together in each rail. According to additional aspects, this allows each rail 202 to be automatically configured for correct operation without the involvement of, or configuration performed by, an external entity such as host 108 in FIG. 1.

In the example of FIG. 2, the voltage/address pin 222 is used to determine the value of the output voltage 206 for the respective rail 202, and also provides controller unique ID and address information for allowing each controller to be separately accessed via bus 208 and identified by other controllers via bus 210, as will be described in more detail below. In embodiments, the configuration of voltage/address pin 222 is implemented using a pinstrap, wherein the resistance values of a resistor network that is hard-wired or connected to pin 222 are used to select one of a plurality of predetermined combinations of output voltages and addresses. This can be done using techniques such as those described in U.S. Pat. No. 8,018,367, the contents of which are incorporated herein by reference herein in their entirety.

Figure 3:
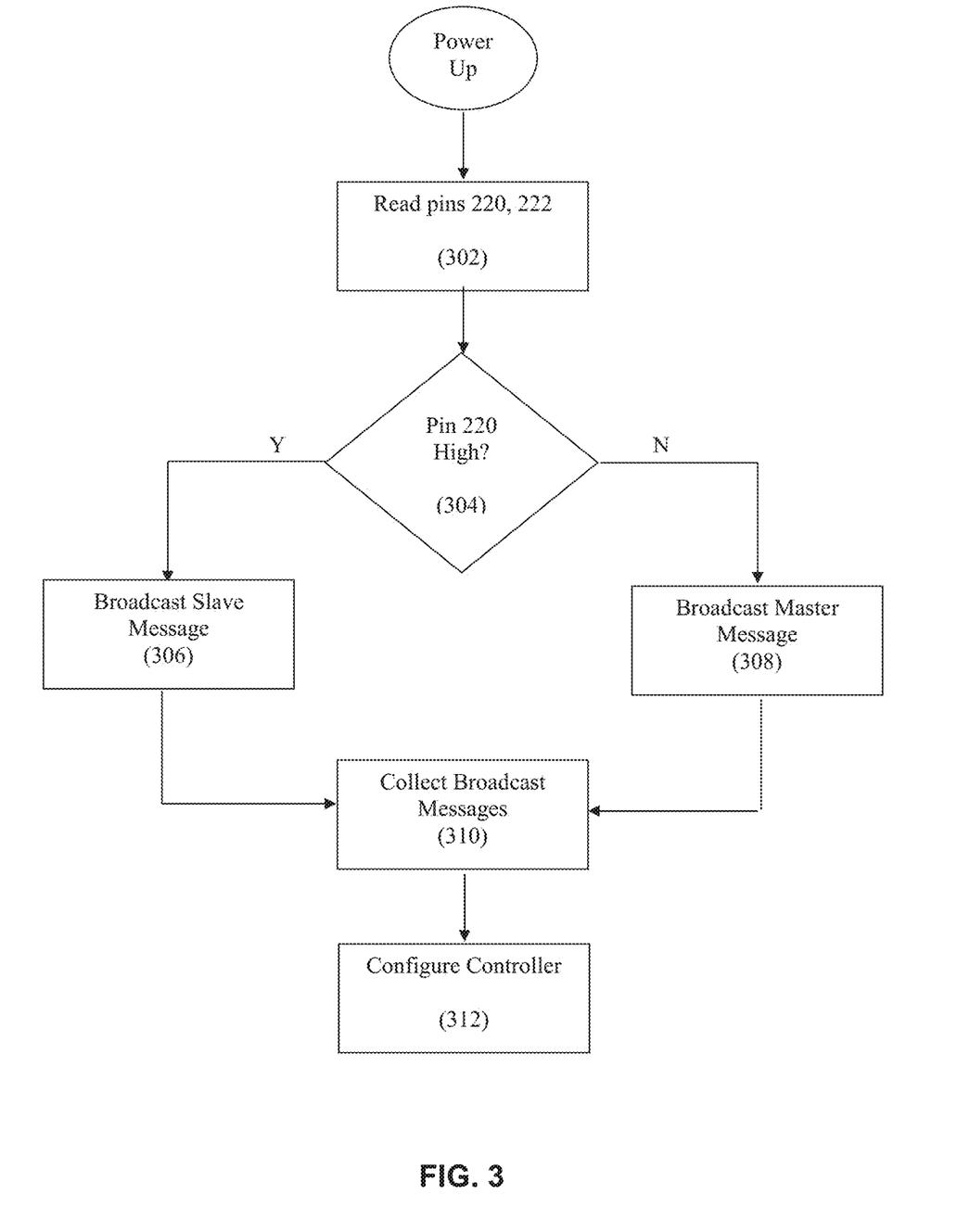
FIG. 3 is a flow diagram illustrating an example methodology of performing autoconfiguration of multiphase controllers such as those shown in FIG. 2 according to embodiments.

FIG. 3 is a flowchart illustrating an example methodology according to embodiments such as that shown in FIG. 2.

When the system is powered up each controller 204 reads the master/slave pin 220 and voltage/address pin 222 in block 302. If it is determined in block 304 that the pin 220 is high then the controller 204 is a slave phase and it sends an auto configuration message indicating its unique ID in block 306 to the other controllers via bus 210. If the pin 220 is low then the controller 204 knows it is the master phase and in block 308 sends an auto configuration message indicating that it is the master and what the SMBus/PMBus base address will be from its own voltage/address pin 222. In block 310 all of these auto configuration messages are received by the controller 204 from all of the controllers via bus 210, perhaps after waiting for a predetermined timeout interval. From these messages, each controller knows how many total controllers are in the system, which controller is the master, and, based on the master's SMBus/PMBus base address, and what SMBus/PMBus address range to use.

Using this information, each controller configures itself in block 312 based on following example algorithm:
- The master controller 204-M will be phase 0. This controller will supply an external clock and telemetry information to the slave controllers 204-S.
- The slave controller with the lowest unique ID will be phase 1. The next lowest unique ID will be phase 2 and so on.
- The controllers 204 will set their interleave values according to their phase numbers and the total number of phases in the rail 202.
- The slave phases will set their SMBus/PMBus address based on the master phase base address. Phase 1's address will be the master's address plus 1, phase 2's address will be the master's address plus 2, and so on.

Figure 4:
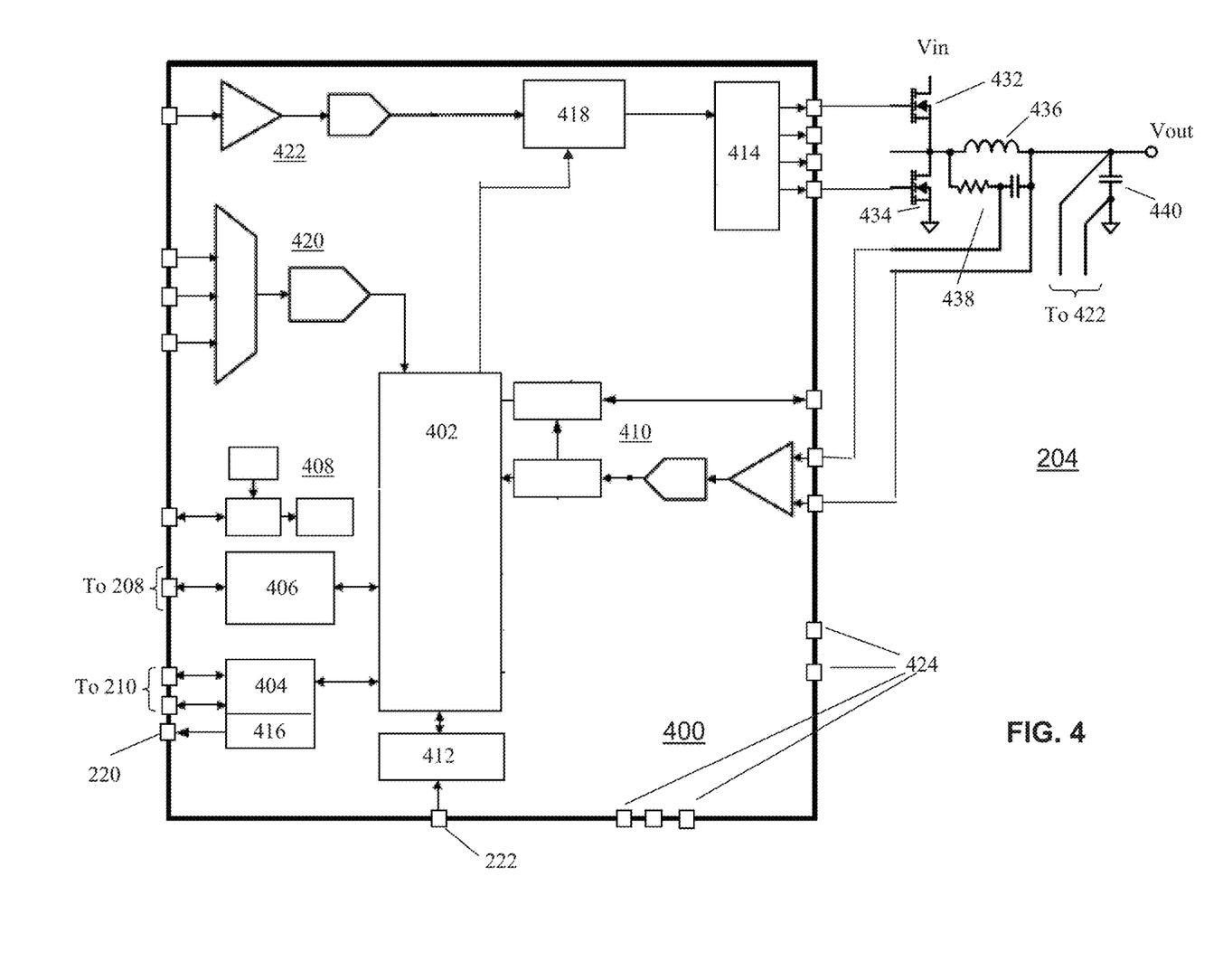
FIG. 4 is a block diagram illustrating an example controller that can be adapted for use in a system such as that shown in FIG. 2.

FIG. 4 is a block diagram illustrating an example controller 204 such as that shown in FIG. 2.

As shown, each controller/phase according to this example includes an integrated circuit 400 for controlling the supply of the regulated output voltage Vout based on an input voltage Vin using a pair of switching transistors 432/434 (e.g. power MOSFETs), an output filter including inductor 436 and capacitor 440 and PWM techniques known to those skilled in the art, and as will be described more fully below. The Vout pin of controller 204 shown in FIG. 2 is commonly connected to the Vout pin of each other controller/phase in a rail.

According to aspects of the present embodiments described above, IC 400 includes master/slave pin 220 and voltage/address pin 222. The master/slave pin 220 is read by block 416 (e.g. an ADC), which provides the value of the voltage that is hard-wired or connected to pin 220 to microcontroller 402. Likewise, the voltage/address pin 222 is read by block 412 (implemented using one or more ADC's and hard-wired resistor networks such as that described in U.S. Pat. No. 8,018,367), and the corresponding information is provided to microcontroller 402. As described in more detail above, microcontroller 402 (including a non-volatile memory (NVM) storing firmware, etc.) uses this information to perform the autoconfiguration methodologies of the present embodiments, including the power-up processing described above in connection with FIG. 3. As shown, IC 400 can further include other pins 424 that are used during power-up and other operations of controller 204. These pins can include pins coupled to local bus 210 and to SMBus/PMBus 208, with communications between controller 204 and these buses controlled by blocks 404 and 406, respectively. For example, as shown, block 406 can be coupled to a single pin for implementing SMBus/PMBus serial communications with a host via bus 208, and block 404 can be coupled to a pair of pins (e.g., a serial line and a clock line) for serial communications with other controllers via bus 210.

Microcontroller 402 can further perform standard control of the operation of controller 204, including the controlling of switches 432 and 434 using PWM modulator 418 and driver 414. For example, the output voltage is fed back from Vout and output capacitor 440 to an error amplifier 422 and to PWM modulator 418. Using this feedback and perhaps other control signals from microcontroller 402 (e.g. timing to ensure proper phase interleaving with other phases), PWM modulator 418 generates and adjusts the pulse width of the PWM signal provided to driver 414, which level shifts and provides the appropriate switching signals to transistors 432/434. It should be noted that in other embodiments, driver 414 can be included in a separate circuit or IC. Current information can also be derived from DCR network 438 and provided to a current block 410 (e.g. an ADC and a current synthesizer) and to microcontroller 402. This current information can also be shared with other controllers by block 410, and the shared current information from other controllers can also be received for implementing current balancing between phases.

During operation, and depending on whether controller 204 is configured as a master, microcontroller 402 can further perform other master operations. For example, clock circuitry 408 can generate a clock signal that is distributed to the other controllers in the rail, for example to control the common switching frequency. Likewise, telemetry information (e.g. temperature, etc.) can be collected from block 420 and distributed to the other controllers in the rail.

It should be noted that, according to aspects of the present embodiments, IC 400 can implement a master controller, a slave controller, and can be included in a rail with any number of phases, as well as to automatically operate as any phase number within the total number of phases. There is no need to be configured by an external host, or to store particular configuration in NVM, such as the NVM included in 402.

Figure 5:
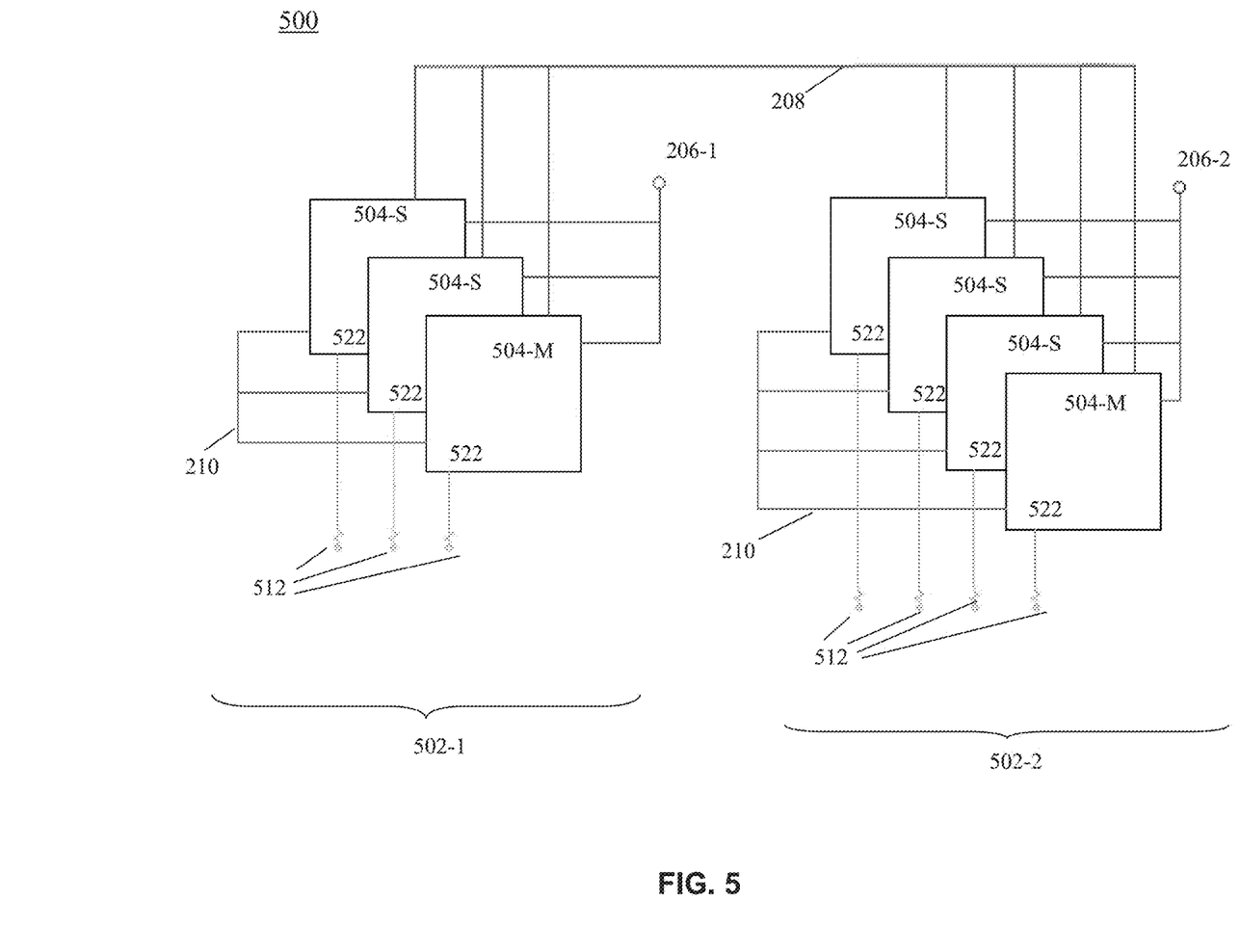
FIG. 5 is a block diagram of another example system having a plurality of rails including multiphase controllers according to the present embodiments.

FIG. 5 is a block diagram illustrating another example system according to embodiments. Similar to system 200 described above in connection with FIG. 2, the system 500 includes a plurality of rails (e.g. rail 502-1 and 502-2 as shown), with each rail 202 comprising an independent plurality of controllers 504 (i.e. phases), with the number of controllers 504 in each rail 202 possibly being different from each other. For example, as shown in FIG. 5, rail 202-1 includes three phases/controllers 504 and rail 202-2 includes four phases/controllers 504. Each rail 202 further supplies a respective output voltage 206 to one or more loads (not shown). Although only two rails are shown, it should be noted that the number of rails is not limited to this number and in some embodiments, the number of rails can be eight or higher. Further similar to the example shown in FIG. 2, the controllers 504 of each rail 202 are all communicatively coupled to a bus 208 (e.g. SMBus/PMBus), which may be further communicatively coupled to a host (not shown) such as a host as described above in FIG. 1. Meanwhile, each controller 504 in a rail is communicatively coupled to each other via a local bus 210.

According to some aspects, the embodiment shown in FIG. 5 uses only one pin on each controller 504 for configuration, in particular voltage/address pin 522. In this embodiment, the voltage/address pin 522 contains information that can be used to determine whether the controller is the master or a slave (denoted as 504-M or 504-S, respectively in FIG. 5). In addition, the voltage/address pin 522 is used to determine the value of the output voltage 206 for the respective rail 202, and also provides controller unique ID and address information for allowing each controller to be separately accessed via bus 208 and identified by other controllers via bus 210, as will be described in more detail below. In embodiments, the configuration of voltage/address pin 522 is implemented using a pinstrap, wherein the resistance values of a resistor network connected to pin 522 are used to select one of a plurality of predetermined combinations of output voltages, addresses and other identification information, using techniques described in U.S. Pat. No. 8,018,367 for example.

Those skilled in the art will be able to implement a controller 504 for use according to these embodiments by adapting a controller 204 such as that described in the example of FIG. 4, and using the example descriptions herein.

Figure 6:
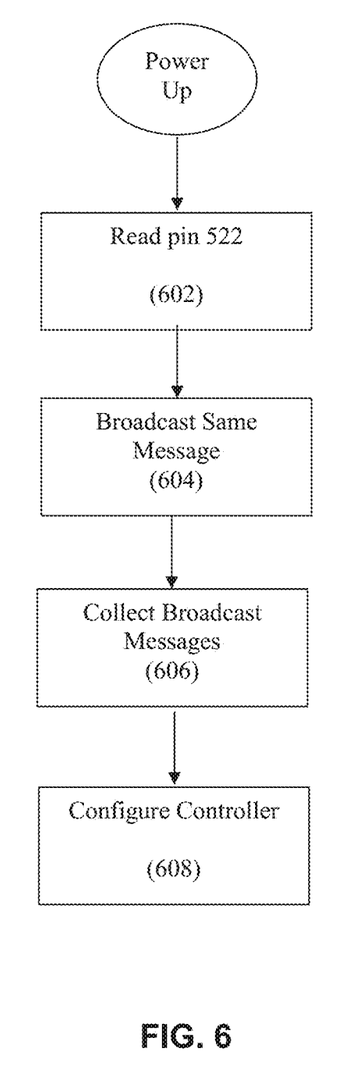
FIG. 6 is a flow diagram illustrating an example methodology of performing autoconfiguration of multiphase controllers such as those shown in FIG. 5 according to embodiments.

FIG. 6 is a flowchart illustrating an example methodology that can be used in a system such as that shown in FIG. 5.

When the system 500 is powered up each controller 504 reads its voltage/address pin 522 in block 602. In block 604, each device sends the same auto configuration message indicating their unique ID to all other controllers 504 via bus 210. In block 606, all of these auto configuration messages are received by all of the controllers in the rail, perhaps after a predetermined timeout interval. Based on these messages, each controller knows how many controllers are in the rail and their unique ID's. Using this information each controller configures itself in block 608 based on following algorithm:

The device with the lowest unique ID will be the master device and will be phase 0. This device will supply an external clock and telemetry information to the slave devices.

The device with the next lowest unique ID will be phase 1, the next lowest phase 2, and so on.

The devices will set their interleave value according to their phase number and number of phases in the rail.

The devices PMBus address will be determined by their unique ID.

One advantage of the autoconfiguration functionality described above is that a broader range of system configurations can be achieved with fewer configuration pins or stored configurations. It also eliminates the need for the device to be configured using an external host. This is especially attractive to plug-and-play modular buck regulator design.

Although this advantage is significant, among other things, the present Applicant recognizes that in a multiphase buck controller system, if there is a power failure or power glitch, some controllers may experience reset/POR while others may not. This creates a system in which there is lack of synchronization between the multiphase controllers, resulting either in a non-functional system or a damaged system.

Some possible solutions to this problem could include system solutions such as: 1) Requiring a host (e.g. an embedded controller) to monitor the power supply and reset the whole system upon power failures or power glitches, and 2) Requiring an external circuit to trip and reset the system upon power failures and power glitches. It would be desirable, however, to have a solution that is applicable to a modular plug-and-play product. Such an approach would not require a system solution such as those described above, and would be less expensive, firmware based, simple, and can be included with every module.

According to certain aspects, the present embodiments implement a simple but effective firmware solution. The method includes using inter-controller communication (e.g. via a local bus 210) and leverages the ability of controllers to force a POR with a register write.

One aspect of the present embodiments is to be able to differentiate between a normal bootup versus a POR bootup. A normal bootup is when the whole system is booted up such as cycling the power supply while the POR bootup is a partial system bootup caused by power failure/glitches. When it is a normal bootup, everyone will automatically sync up and be configured correctly. On the other hand, when a controller experiences a POR bootup, the present embodiments allow each controller to quickly recognize the situation and take action to reboot the whole system (i.e execute a normal bootup).

Figure 7A:
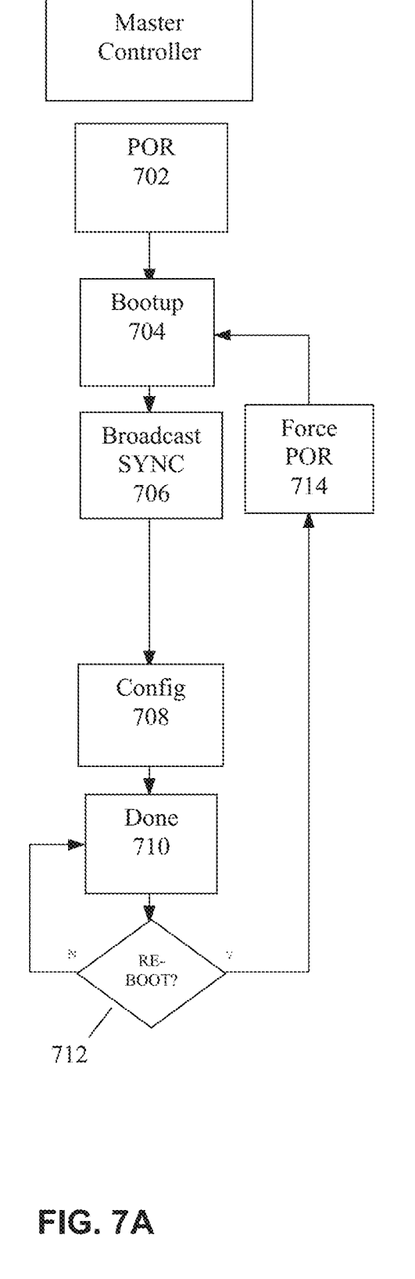
FIGS. 7A and 7B are flow diagrams illustrating an example of automatic POR detection and recovery in a multi-phase buck controller according to embodiments.
Figure 7B:
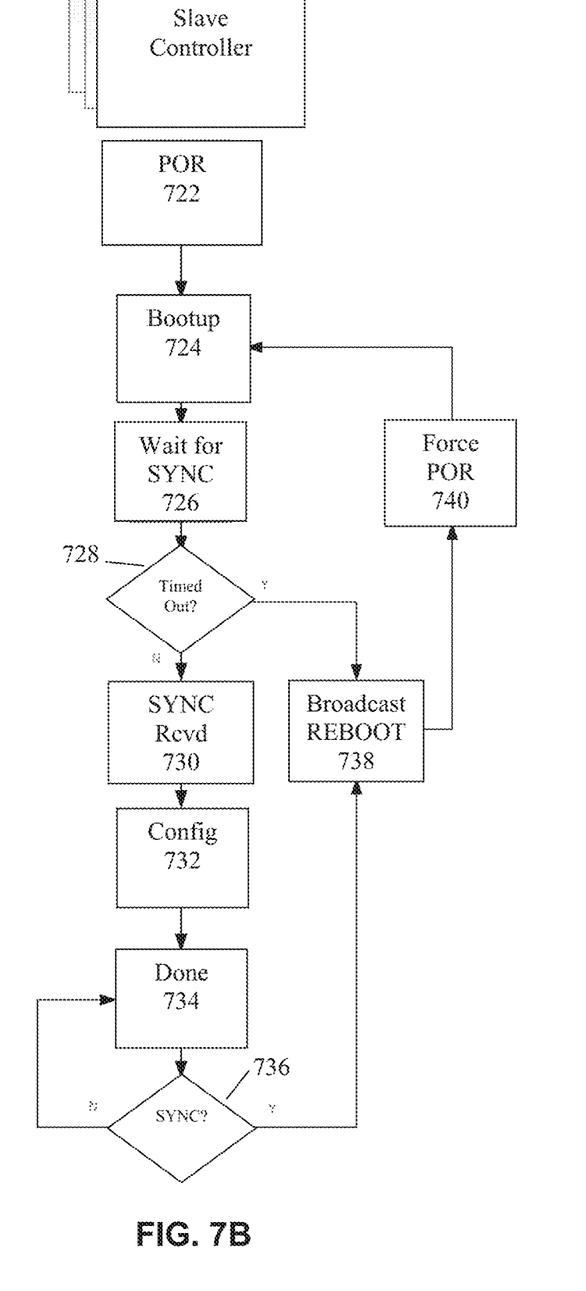

FIGS. 7A and 7B are flow diagrams illustrating an example of automatic POR detection and recovery in a multi-phase buck controller according to embodiments. In particular, the flow diagram in FIG. 7A illustrates an example methodology implemented by a master controller. Meanwhile, the flow diagram in FIG. 7B illustrates an example methodology implemented by a slave controller. The example method shown in FIGS. 7A and 7B can be implemented using controllers such as controllers 204-M and 204-S in FIG. 2 or controllers 504-M and 504-S in FIG. 5 and including logic such as microcontroller 402 and associated firmware as described in connection with FIG. 4. However, it can also be implemented by other controllers that do not necessarily have the autoconfiguration functionality of those controllers.

As shown in FIG. 7A, when the master controller experiences a POR event in 702, it performs a bootup process in 704. Thereafter, in 706, the master controller broadcasts a SYNC packet, for example on the communication bus (e.g. local bus 210). It then configures itself in 708 and waits for any packets from other controllers on the communication bus in 710. As will be described in more detail in connection with FIG. 7B, if a slave controller experiences a POR event, it will broadcast a REBOOT packet that is received by the master controller at 712. At that point the master controller with force a POR and start the above described overall system boot and synchronization process beginning at 704.

Meanwhile, as further shown in FIG. 7B, when slave controllers experience a POR in 722 and after they bootup in 724, they will always wait and start a timeout timer for the SYNC packet on the communication bus (e.g. local bus 210) after bootup in 726.

If it is determined in 728 that the slave does not get the SYNC packet after its timer times out, it knows it encountered a POR event and not a system boot. It then broadcasts the REBOOT packet on the communication bus (e.g. local bus 210) in 738. In 712, the master controller receives this packet and reboots in 714. As indicated by 740, this causes all the remaining slaves to reboot and the master will send out a SYNC packet as described above. The master controller reboots again as long as any of the remaining slave sends out REBOOT pkt until all master/slaves are in sync. The overall system will now experience a proper system boot and will be synchronized and configured correctly.

If it is determined in 728 and 730 that the SYNC packet was received in time, then the slave controller knows that it was the result of a system boot initiated by the master controller as described above in connection with FIG. 7A. In 732, the slave therefore configures itself and monitors the communication bus in 734 for a separate SYNC packet from the master controller (in the event of a master POR and/or system boot), as determined in step 736.

For example, in connection with step 736, in the event that the master controller experiences a POR and not slaves, the master controller boots up and broadcasts the SYNC packet and the slaves receives the packet after they completed their configuration in 732. If that happens, this allows the slaves to know that the master experienced a POR event, and the system is not synchronized. So it they will then broadcast a REBOOT packet in 738 and every controller (master and slaves) forces a POR on itself and reboots. Everything will thereafter be synchronized and configured correctly.

As should be apparent from the foregoing, the example methodology in FIGS. 7A and 7B ensure that the system recovers from any type of POR event affecting any one of the master and slave controllers.

Figure 8A:
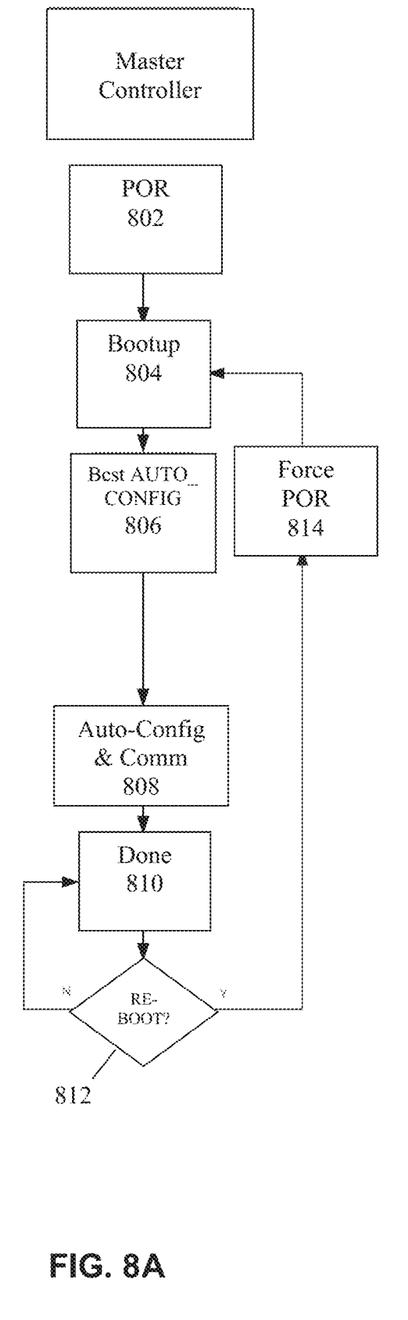
FIGS. 8A and 8B are flow diagrams illustrating another example of automatic POR detection and recovery in a multi-phase buck controller according to embodiments.
Figure 8B:
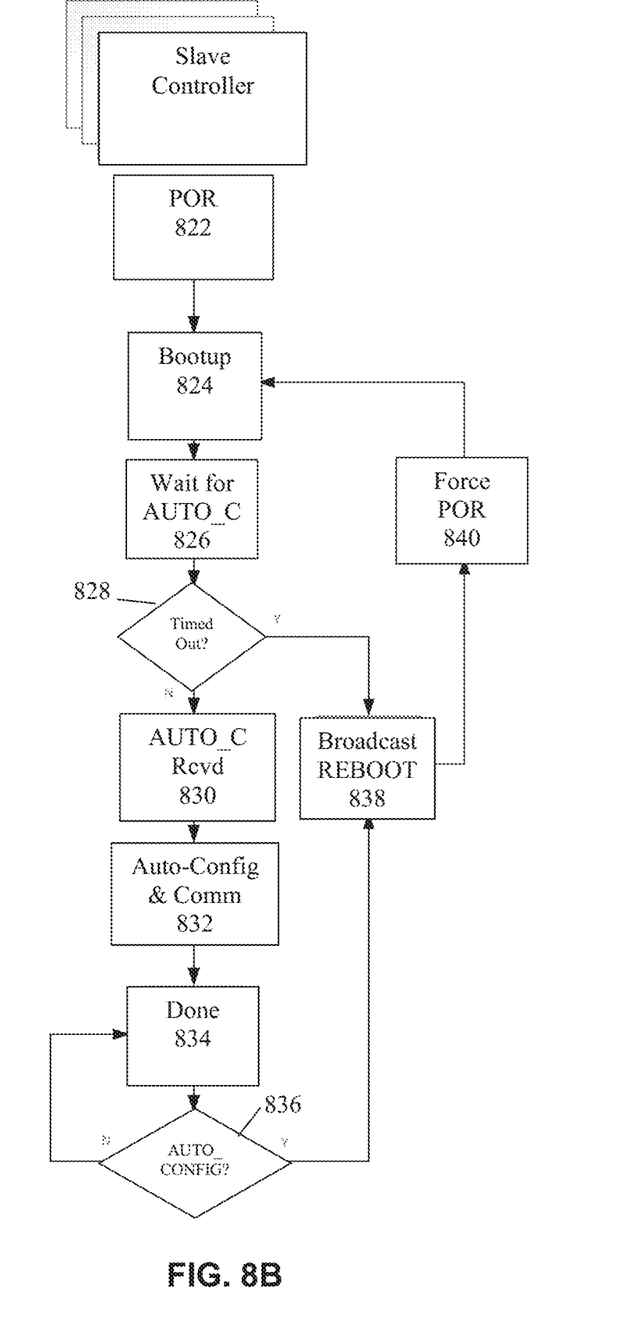

FIGS. 8A and 8B are flow diagrams illustrating another example of automatic POR detection and recovery in a multi-phase buck controller according to embodiments. In particular, the flow diagram in FIG. 8A illustrates an example methodology implemented by a master controller. Meanwhile, the flow diagram in FIG. 8B illustrates an example methodology implemented by a slave controller.

According to certain aspects, the example method shown in FIGS. 8A and 8B illustrate how the autoconfiguration functionality described above can be combined with the automatic POR detection and recovery functionality of the present embodiments. Those skilled in the art will understand how this automatic POR detection and recovery methodology can be implemented using controllers such as controllers 204-M and 204-S in FIG. 2 or controllers 504-M and 504-S in FIG. 5—as well as logic such as microcontroller 402 and associated firmware as described in connection with FIG. 4—after being taught by the following examples. For example, as described above in connection with FIGS. 2 and 3, the controller can be configured as a master or slave via pin 220. As such, when a controller experiences a POR event (e.g. 802 or 822) it can determine whether to perform the method of either FIG. 8A or 8B by sensing the voltage at its pin 220.

As shown in FIG. 8A, when a controller configured as a master experiences a POR event in 802, it performs a bootup process in 804 (which can include sensing the voltage at is pin 220). Thereafter, in 806, the master controller broadcasts an AUTO_CONFIG packet, for example on the communication bus (e.g. local bus 210). It then performs a configuration process in 808, including for example by communicating with other controllers to share configuration information and performing the autoconfiguration methodologies described above (e.g. detecting number of phases, configuring phase interleaving, etc.). After configuring and beginning operation, it waits for any packets from other controllers on the communication bus in 810. As will be described in more detail in connection with FIG. 8B, if a slave controller experiences a POR event, it will broadcast a REBOOT packet that is received by the master controller at 812. At that point the master controller with force a POR and start the above described overall system boot and synchronization process beginning at 804.

Meanwhile, as further shown in FIG. 8B, when slave controllers experience a POR in 822, they perform an initial boot in 824. After this initial boot (which can include determining that it is a slave by sensing its pin 220), they will wait and start a timeout timer for the AUTO_CONFIG packet on the communication bus (e.g. local bus 210) in 826.

If it is determined in 828 that the slave does not get the AUTO_CONFIG packet after its timer times out, it knows it encountered a POR event and not a system boot. It then broadcasts the REBOOT packet on the communication bus (e.g. local bus 210) in 838. In 812, the master controller receives the REBOOT packet and forces a POR and reboot in 814. Because this will cause the master to send out an AUTO_CONFIG packet as described above, the overall system will now experience a proper system boot and will be synchronized and configured correctly.

If it is determined in 828 and 830 that the AUTO_CONFIG packet was received in time, then the slave controller knows that it was the result of a system boot initiated by the master controller as described above in connection with FIG. 8A. In 832, the slave therefore then performs the configuration process similar to that performed by the master in 808 and 830, which can include any of the autoconfiguration methodologies described above. Thereafter, and during normal operation, the slave monitors the communication bus in 834 for a separate AUTO_CONFIG packet from the master controller (in the event of a master POR and/or system boot), as determined in step 836.

Similar to the example of FIGS. 7A and 7B, in connection with step 836, in the event that the master controller experiences a POR and not slaves, the master controller boots up and broadcasts the AUTO_CONFIG packet and the slave receives the packet after it has completed its configuration in 832. If that happens, this allows the slave to know that the master experienced a POR event, and the system is not synchronized. So it will then broadcast a REBOOT packet in 838 and forces a POR on itself and the system reboots. As described above, the master controller reboots again and sends out AUTO_CONFIG pkt and now all are in sync. Everything will thereafter be synchronized and configured correctly.

As should be apparent from the foregoing, the example methodology in FIGS. 8A and 8B ensure that the system recovers from any type of POR event affecting any one of the master and slave controllers, including performing the autoconfiguration processes described above.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A multiphase voltage regulator, comprising:
a plurality of controllers respectively associated with a plurality of phases of the multiphase voltage regulator, each controller of the plurality of controllers comprising:
a package having a plurality of pins, the plurality of pins including a connection to a local bus allowing for communication with each of the other plurality of controllers; and
logic coupled to the communication bus that is adapted to automatically communicate with the other plurality of controllers and to synchronize with the other plurality of controllers when any of the other plurality of controllers encounters a power on reset (POR) event.

2. The multiphase voltage regulator of claim 1, wherein the logic is further adapted to cause a master one of the plurality of controllers to broadcast a synchronization message on the communication bus in response to the POR event, and wherein the logic is further adapted to cause a slave one of the plurality of controllers to wait for the synchronization message on the communication bus in response to the POR event.

3. The multiphase voltage regulator of claim 2, wherein the logic is further adapted to cause a slave one of the plurality of controllers to broadcast a reboot message if the synchronization message is not received on the communication bus within a timeout period.

4. The multiphase voltage regulator of claim 3, wherein the logic is further adapted to each of the plurality of controllers to force a POR in response to receiving the reboot message on the communication bus.

5. The multiphase voltage regulator of claim 1, wherein the logic is further adapted to automatically determine a phase number of the each controller based on information broadcast by the plurality of controllers on the local bus.

6. The multiphase voltage regulator of claim 5, wherein the logic is further adapted to automatically control phase interleaving for the each controller based on the determined phase number.

7. The multiphase voltage regulator of claim 1, wherein logic is further adapted to perform a master or slave POR recovery process based on a voltage value that is hard-wired to a master/slave pin on the package.

8. A method for operating a multiphase voltage regulator, the multiphase voltage regulator comprising a plurality of controllers respectively associated with a plurality of phases of the multiphase voltage regulator, each controller of the plurality of controllers comprising a package having a plurality of pins, the plurality of pins including a connection to a communication bus allowing for communication with each of the other of the plurality of controllers, the method comprising:
detecting a power on reset (POR) event at one of the plurality of controllers;
communicating between all of the plurality of controllers so as to cause each controller to synchronize with each of the other plurality of controllers in response to the POR event.

9. The method of claim 8, wherein communicating includes:
a master one of the plurality of controllers broadcasting a synchronization message on the communication bus in response to the POR event at the master controller; and
a slave one of the plurality of controllers waiting for the synchronization message on the communication bus in response to the POR event at the slave controller.

10. The method of claim 9, wherein communicating further includes the slave controller broadcasting a reboot message if the synchronization message is not received on the communication bus within a timeout period.

11. The method of claim 10, further comprising:
the master one of the plurality of controllers forcing a POR in response to receiving the reboot message on the communication bus.

12. The method of claim 8, further comprising:
automatically determining a phase number of each controller based on information broadcast by the plurality of controllers on the communication bus.

13. The method of claim 12, further comprising:
automatically controlling phase interleaving for each controller based on the determined phase number.

14. The method of claim 8, further comprising configuring each of the plurality of controllers to perform a master or slave POR recovery process based on a voltage value that is hard-wired to a master/slave pin on the package.

* * * * *